US 6,724,879 B1

(12) United States Patent
Peltonen et al.

(10) Patent No.: US 6,724,879 B1
(45) Date of Patent: Apr. 20, 2004

(54) METHOD FOR TRANSMITTING OPERATION AND MAINTENANCE FUNCTIONS IN A TELECOMMUNICATIONS SYSTEM

(75) Inventors: Pasi Peltonen, Oulu (FI); Jussi Sarpola, Oulu (FI); Hannu Asujamaa, Oulu (FI)

(73) Assignee: Nokia Corporation, Espoo (FI)

( * ) Notice: Subject to any disclaimer, the term of this patent is extended or adjusted under 35 U.S.C. 154(b) by 776 days.

(21) Appl. No.: 09/586,727

(22) Filed: Jun. 5, 2000

Related U.S. Application Data

(63) Continuation of application No. PCT/FI98/00951, filed on Dec. 7, 1998.

(30) Foreign Application Priority Data

Dec. 8, 1997 (FI) .................................................. 974453

(51) Int. Cl.[7] .................................................. H04M 7/00
(52) U.S. Cl. .................... 379/219; 379/220.01; 455/403
(58) Field of Search ........................... 379/219, 220.01; 455/403

(56) References Cited

U.S. PATENT DOCUMENTS

| | | | |
|---|---|---|---|
| 5,475,735 A | 12/1995 | Williams et al. | |
| 5,781,623 A | 7/1998 | Khakzar | |
| 6,185,412 B1 * | 2/2001 | Pentikainen et al. | 455/404.1 |
| 6,324,281 B1 * | 11/2001 | Liinamaa et al. | 379/242 |
| 6,434,377 B1 * | 8/2002 | Penttinen | 455/404.1 |
| 6,459,893 B2 * | 10/2002 | Pentikainen | 455/414.1 |

FOREIGN PATENT DOCUMENTS

| | | |
|---|---|---|
| GB | 0 298 339 | 8/1996 |
| WO | 94/14250 | 6/1994 |
| WO | 96/07278 | 3/1996 |
| WO | 97/09833 | 3/1997 |

OTHER PUBLICATIONS

ETSI 300 347–1 Signalling Protocols and Switching (SPS); V interfaces at the digital Local Exchange (LE) V5.2 Interface for the support of Access Network (AN); Part 1: V5.2 interface specification, Sep. 1994.

ETSI 300324–1 Signalling Protocols and Switching (SPS); V interfaces at the digital Local Exchange (LE) V5.2 Interface for the support of Access Network (AN); Part 1: V5.1 interface specification, Feb. 1994.

\* cited by examiner

*Primary Examiner*—Ahmad F. Matar
*Assistant Examiner*—Rasha Al-Aubaidi
(74) *Attorney, Agent, or Firm*—Squire, Sanders & Dempsey L.L.P.

(57) ABSTRACT

Procedure for the transmission of operation control functions in a telecommunication system comprising a local exchange, a user interface provided in the system, an access node connected to the local exchange via a V5 interface, a wireless local loop system connected to the access node and a terminal device connected to the access node via the wireless local loop system. In the procedure, the operation control functions are generated in the access node on the basis of input supplied via the user interface, and transmitted in the form of short messages directly from the access node to the terminal device.

20 Claims, 1 Drawing Sheet

Figure 1:
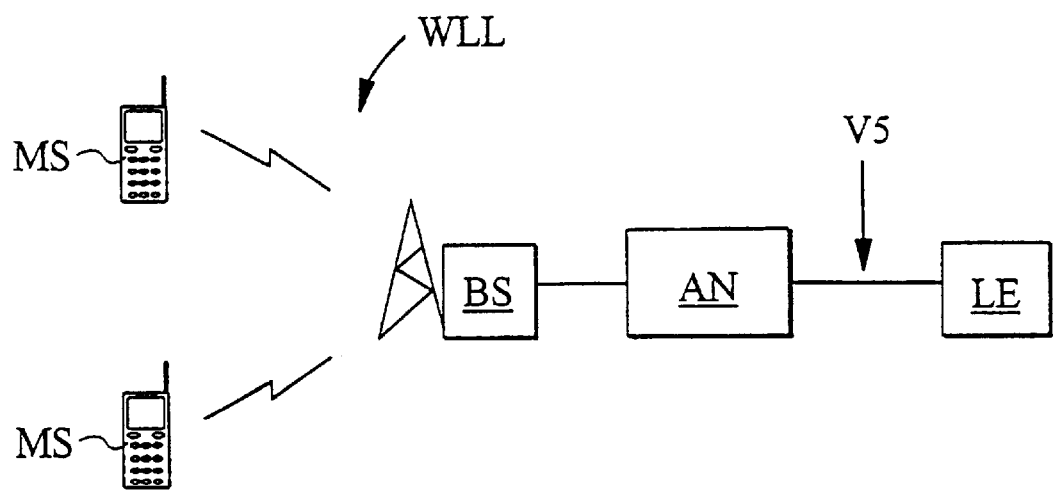

METHOD FOR TRANSMITTING OPERATION AND MAINTENANCE FUNCTIONS IN A TELECOMMUNICATIONS SYSTEM

This application is a continuation of international application Ser. No. PCT/FI98/00951, filed Dec. 7, 1998.

The present invention relates to a procedure as defined in the preamble of claim 1 for the transmission of operation control functions in a telecommunication system. In particular, the invention relates to the transmission of operation control functions in a WLL system (WLL, Wireless Local Loop).

WLL means connecting a subscriber to a telephone network via a wireless local loop system. The subscriber interface is formed by using a special terminal device. In principle, the terminal device functions like a mobile station known in itself, but it can be assigned a limited mobility area within which it can work. A wireless local loop system can be implemented using any one of several telecommunication systems known in themselves, such as the GSM network (GSM, Global System for Mobile Communications).

The entire WLL system architecture can be built in different ways Among the possible alternatives are a system solution and an access network solution. The system solution is based on the GSM mobile telephone network known in itself and on the operation of a mobile services switching centre (MSC). The system solution functions as a part of the mobile telephone network, so it can also use the services available in the mobile telephone network, such as the short-message service implemented by a short-message service centre.

The access network solution consists of a local exchange, an access node, base transceiver stations and terminal equipment, all known in themselves. In the WLL system, a method for transmitting operation control functions in the form of short messages has been developed. The access network solution comprises no separate short-message service centre, and therefore the short-message service cannot be utilised.

The object of the present invention is to eliminate the drawback mentioned above. A further object of the invention is to disclose a new type of procedure for transmitting short messages in a WLL system without a short-message service centre.

As for the features characteristic of the invention, reference is made to the claims.

The system of the invention comprises an access node connected via a V5 interface to a local exchange. V5 interfaces (V5.1 and V5.2) are defined in ETSI (European Telecommunications and Standard Institute) standards of the ETS 300 324 and ETS 300 347 series. V5 interfaces allow subscribers belonging to a physically separate access network to be connected using the standard interface of a telephone exchange. In conjunction with the access node there is a user interface which can be used to take care of operation control and maintenance functions. Alternatively, the user interface can be implemented e.g. as a remote session via the local exchange user interface or by providing a separate centralised operation control site from where the operation of both the local exchanges and the access nodes is controlled. The access node is further connected via an Abis interface to the wireless local loop system which connects the terminal equipment to the system. The Abis interface is a standard interface used in the GSM mobile telephone system between a base station controller and a base station. A plurality of terminal devices can be connected to the same access node.

According to the invention, the operation control functions are generated in the access node on the basis of input supplied via the user interface. From the operation control functions, short messages are generated in the access node, which transmits them directly to the terminal device.

As compared with prior art, the present invention provides the advantage that no separate short-message service centre is needed in conjunction with operation control functions sent to a terminal device in the form of short messages.

In a preferred embodiment of the present invention, the transmission of short messages is combined with a call control slave chain. The program blocks participating in the operation control and maintenance of terminal equipment as well as the program block controlling the short-message service consist of master and slave processes. A first process sends a service request to the master of a second process, which in turn starts a slave corresponding to the identifier of the first process. The slave process takes care of providing the service throughout the exchange of messages until, after the service has been terminated, it releases itself and the resources it has engaged. The previously known call control system, used in the access node is based on a corresponding master-slave procedure.

In a preferred embodiment of the present invention, the access node processes the data in the TL and RL layers (TL, Transport Layer; RL, Relay Layer) of the short message. In this respect, the invention differs from prior art in that, in the system solution, only the short-message service centre processes the TP-DATA of the TL layer. TP-DATA is a communication protocol used in a mobile telephone system between a short-message service centre and a mobile station. Correspondingly, the mobile services switching centre only communicates using the RL and CM layers (CM, Connection Management), transmitting TP-DATA untouched to the terminal device.

In a preferred embodiment of the present invention, the connection between the terminal device or subscriber line and the corresponding slave process in the access node is accomplished on the basis of an identifier received from the user interface. The identifier may be the V5 interface subscriber identity code of the terminal device or its IMSI code (IMSI, International Mobile Subscriber Identity).

In a preferred embodiment of the present invention, the operation control functions defined by the user interface are converted in the access node into a form compatible with the terminal device. Different terminal devices may have different software versions, so the access node gets the operation control functions applicable to each software version from a file of operation control functions.

In a preferred embodiment of the present invention, a timed operation control function is not sent as such to the terminal device, but the timing is accomplished in the access node by using a separate timer. Upon the lapse of the length of time set in the timer, the processing of the operation control function is continued normally.

In a preferred embodiment of the present invention, a response to an operation control function sent to the terminal device is expected in the access node. In this case, the slave process responsible for the operation control function remains active until the response function is received.

In a preferred embodiment of the present invention, the identification number of the access node is added to the sender field of the RL layer of the short message. This provides the advantage that messages pertaining to different access nodes are distinguished from each other. The procedure differs from the mobile telephone system, where the sender field contains the number of the short-message service centre.

In a preferred embodiment of the present invention, the access node fills in all the fields required in the short message even if they have no significance. This ensures that the message fulfils the criteria pertaining to a short message.

In a preferred embodiment of the present invention, the operation control function consists of a plurality of short messages. In this case messages related to the same function are transmitted in succession.

In a preferred embodiment of the present invention, the access node releases the resources engaged in the transmission of a short message after receiving an acknowledgement of successful transmission of the operation control function.

In a preferred embodiment of the present invention, the access node sends the operation control function to the terminal device in an encrypted form.

In a preferred embodiment of the present invention, subscriber identification, message encryption and formation of a slave chain in conjunction with the reception of a short message are accomplished in the same way as in the case of a normal call.

In a preferred embodiment of the present invention, the short message sent by the terminal device is decrypted in the access node and the response to the operation control function, is separated from the short message.

In a preferred embodiment of the present invention, the terminal device sends the response to the operation control function in the form of a plurality of short messages. In this case, the assembling of the operation control function is done in the access node.

In a preferred embodiment of the present invention, the channel to be used for short message service is given by the call management in conjunction with subscriber search.

In a preferred embodiment of the present invention, the transmission of the short message is accomplished using the SDCCH signalling channel (SDCCH, Stand-alone Dedicated Control Channel) of the Abis interface. If there is a call going on at the same time, the short message is transmitted using the SACCH signalling channel (SACCH, Slow Associated Control Channel). Similarly, if the terminal device starts call setup in the middle of a short message transmission, the transmission of the message is transferred to the SACCH signalling channel. If the call is terminated during the transmission of a short message, the transmission can be continued either in the SACCH signalling channel or it can be transferred to the SDCCH signalling channel.

In a preferred embodiment of the present invention, the terminal device sends a message to the access node if it has detected an error in the transmission of an operation control function. The error message gives the number code of the error situation. Error messages are sent without encryption. In consequence of the error situation, the access node releases all resources engaged.

In a preferred embodiment of the present invention, the wireless local loop system used is based on a digital mobile communication system, preferably the GSM system.

Figure 2:
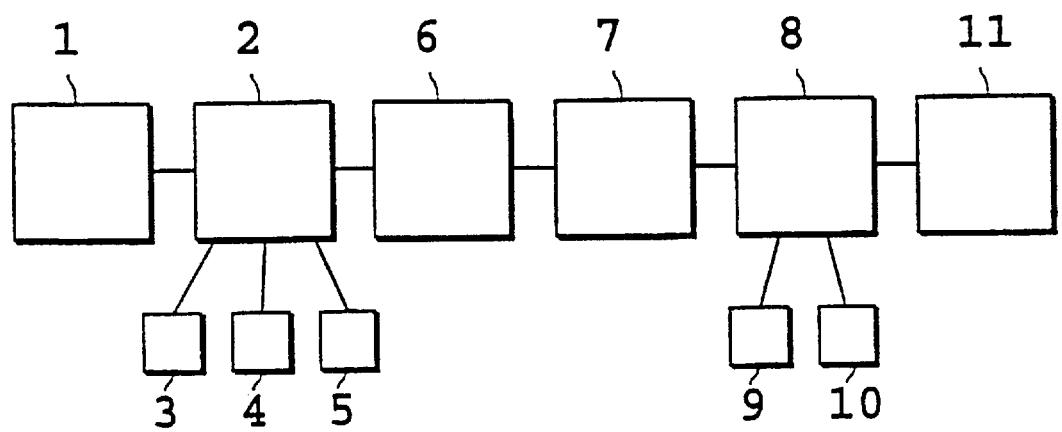

In the following, the invention will be described by the aid of a few examples of its embodiments by referring to the attached drawing, wherein FIG. 1 presents a WLL system according to the invention; and FIG. 2 presents a block diagram of certain program blocks according to the invention.

FIG. 1 shows a wireless local loop WLL in which subscriber terminals MS are connected over a wireless link via a base station BS to an access node AN and from the access node to a wired network local exchange LE via a V5 interface consistent with the ETS 300 347-1 standard.

The user interface used in the procedure of the invention is implemented as program block 1 in FIG. 2, which sends the service requests and associated subscriber identity codes in the form of MML commands (MML, Man-Machine Language) to program block 2. A service request contains the number of the operation control function as well as the required parameters. The subscriber identity code used may consist of the IMSI code of the terminal device being operated or the V5 interface subscriber identifier. If the V5 interface subscriber identifier is used, program block 2 will get the subscriber's IMSI code from a subscriber database 3. The software used for management of the operation control functions is mainly contained in program blocks 2 and 6.

Based on the subscriber identification, program block 2 gets the version number of the RLN management software (RLN, Radio Local Net) of the terminal device from the subscriber database 3. If the version number is not found in the subscriber database, then it is obtained directly from the terminal device. Terminal devices with different version numbers may implement different operation control functions, so the subscriber database must contain the RLN management software version number for each terminal device.

If a service request contains a timed operation control function, then program block 2 saves the service request in a work file 5 and sets a timer. After the timer has tripped, program block 2 reads the service request from the work file 5. From this point onward, a timed operation control function is treated in the same way as a non-timed function. Program block 2 starts the slave process for execution of the service.

The slave process in program block 2 reads file 4 to get the operation control function corresponding to the version number as well as information as to whether the operation control function is to be transmitted in an encrypted form and whether the terminal device has to send a response to the operation control function. Program block 2 sends these data, together with the IMSI code and a random number it has generated for encryption purposes, to program block 6. The slave process of program block 2 releases itself after it has received from program block 6 an acknowledgement of transmission of the operation control function. Program block 2 sends program block 1 an acknowledgement of each operation control function transmitted. If the operation control function requires a response from the terminal device, then the slave process of program block 2 will remain waiting for the response function.

Program block 6 starts a separate slave process for each operation control function request if there are more than one request for a given terminal device. The slave process performs the following tasks in this order: encryption of the operation control function if required, partitioning and assembly of the RLN message, XXE encoding of each message, and sending a short message start request to the call management block 7. An operation control function is partitioned into one to four RLN messages. XXE encoding means encoding eight-bit data as seven-bit ASCII characters.

The short message start request contains the IMSI code. The call management block 7 performs a subscriber search, whereupon it sends a start request for a terminating short message to the short message management program block 8. The short message management program block 8 comprises a CM sub-automaton 9 and an RL sub-automaton 10. Program block 8 starts the slave process and sends a request for execution to its CM sub-automaton 9. The slave process sends a response message containing a process identifier. A slave chain from the short message management program block to the subscriber 8 has now been formed. The CM sub-automaton 9 is now waiting for the start of the short message service from the RL sub-automaton 10. The call management program block 7 carries out the subscriber identification and required encryption functions as in the case of a normal call and sends an acknowledgement message to program block 6. The acknowledgement message contains the identifier of the slave process of the CM sub-automaton 9 started for the service. Program block 6 sends this and an RLN message to the short message management program block 8.

After successfully sending the RLN messages to the terminal device, the short message management program block 8 releases the resources used as well as itself. Only the slave processes of program blocks 2 and 6 now remain waiting for a response function from the terminal device. When the response function arrives, the short message management program block 8 receives a start message which, in addition to the short message, contains the IMSI code of the terminal device that sent the message. Program block 8 starts the slave process, whose CM sub-automaton 9 transmits the message to the RL sub-automaton 10. The short message management program block 8 sends the RLN message received to program block 6, which decodes the XXE-encoded RLN message and assembles the response function. Based on the IMSI, program block, 6 determines the slave process waiting for the message and sends it further to that slave process. If there are several slave processes waiting for a response function from the same terminal device, then the correct slave process is distinguished by using both the IMSI and the number of the operation control function.

The short message transmission protocol is partly based on a layer structure consistent with the OSI reference model. The principle is that each layer provides services to the next layer above it. Short-message service involves. TL, RL and CM layers. The CM sub-automaton 9 communicates with the signalling program block 11 of the terminal device and with the RL sub-automaton 10. The CM sub-automaton 9 acts as a sender and receiver of short messages and takes care of the acknowledgements required. The CM sub-automaton 9 transmits the short-message service termination commands received from the RL sub-automaton 10. The CM sub-automaton 9 functions in a way corresponding to its function in the mobile services switching centre.

The RL sub-automaton 10 functions as a receiver of the RLN message and assembler of the short message structure. The RL sub-automaton 10 in the access node differs from the one in the mobile communication switching centre in that it also performs the required assembling functions of the short-message service centre. In other words, the RL sub-automaton 10 of program block 8 performs both TL and RL layer functions. The RL sub-automaton 10 also makes the decision regarding termination of the short-message service.

In generating a short message, program block 8 starts the slave process (sub-automatons 9, and 10), sends the RLN message received from program block 6 to the CM sub-automaton 9, which sends it further to the RL sub-automaton 10. The RL sub-automaton sends its process identifier in an acknowledgement message to the slave process of program block 6. Thus, the slave process of program block 6 will be able to send the next possible RLN messages comprised in the operation control function to the right process.

A slave chain has now been set up from user to subscriber, because, in conjunction with the RLN message, the slave process of program block 6 has sent the slave process identifier it has received from the call control block. Using this identifier, the RL sub-automaton of the slave process sends the short message it has assembled to the CM sub-automaton.

The RL sub-automaton first decodes the contents of the XXE-encoded control byte. The control byte indicates whether there are more RLN messages coming. Next, the RL sub-automaton assembles the short message into a form understood by the terminal device. Most of the TL layer fields of the short message are always set to the same value in the transmission of each short message, for example, number of the sender of the message, which means the number from which the short-message service centre has received the short message to be transmitted. The terminal device only sets this number as the receiver of the message, without modifying the number in any way. The contents of some fields do not make any difference, so the fields can be filled with random characters. The principle is that every field is filled in to ensure that the message will fulfil the criteria for a short message. In the mobile communication system, the sender field in the RL layer means the number of the short-message service centre. This number is always replaced with a concentrator-specific identification number of the access node. This makes it possible to distinguish messages that may have been sent by a terminal belonging to the network of another concentrator.

The short message to be sent to the terminal device is comprised in the TP-DATA of the TL layer. TP-DATA is the communication protocol used in the mobile communication system between the short-message service centre and the mobile station. TP-DATA is invisible with respect to the mobile services switching centre, the base station controller of the mobile communication network and the mobile station. TP-DATA is transmitted within the RL-layer RP-DATA, which in turn is transported within the CM layer CP-DATA to the Abis interface, where the Abis interface program block takes care of sending the message, using the information contained in the CP-DATA. The RP-DATA contained in the CP-DATA is sent unmodified as an L3-message to the base station and further to the terminal.

The CM layer remains waiting for a resource release message from the RL layer after sending the last acknowledgement to the terminal. Upon receiving the release message, the CM layer sends the release message to the call control block and then releases itself. If the operation control function consists of a plurality of RLN messages, then instead of a release message the RL layer will send the next RLN message, packed in the form of a short message, to the CM layer. The CM layer transmits the short message further using the same connection. Program block 6 sends the next RLN message to the RL layer immediately upon receiving an acknowledgement of successful transmission of the previous message.

The terminal device performs the tasks determined by the operation control function and, if necessary, sends the response function as an RLN message. The RLN message has the same structure both when transmitted and when received. As for the CM and RL layers, the short message sent out from the terminal is in principle fully identical with the message received by the terminal, but the TL layer of the outgoing message has one byte more. This byte comprises a consecutive number which is increased by one each time the terminal sends a short message. Based on this value, the access node rejects double messages.

The transmission of a short message from the terminal to the access node is done in almost the same way as the transmission of an ordinary call. Channel allocation, subscriber search, identification and encryption are all performed in the same way in both cases. Instead of sending a call start message, the terminal device starts a short message transmission by setting up a connection using the data link layer service unit SAPI 3 over the Abis interface. A normal call is connected using SAPI 0. After this, the terminal sends the short message, which is transmitted by the call control blocks to the short message management block 8. Program block 8 starts the slave process for execution and sends the short message to the CM sub-automaton of the slave process. The slave process immediately confirms successful slave formation and sends the received short message to the RL layer. The CM layer then sends an acknowledgement of receipt of the short message to the terminal. The RL layer again starts the slave process for execution and sends the short message further to the slave process. The latter separates the RLN message from the short message and decodes its XXE encoded third byte, which indicates whether the RLN message is the only one or whether there are additional messages coming. Next, the slave process sends the message to program block 6, which knows by the sender of the RLN message which slave process in program block 6 is waiting for it and sends the message to that slave process. The slave process in program block 6 decrypts the message if it has been encrypted, and sends an acknowledgement of successful or unsuccessful receipt of the message. The slave process in program block 6 assembles the response function, which may consist of a plurality of RLN messages, and sends it to the slave process in program block 2, until every RLN message has been received.

The RL layer of the slave process receives the acknowledgement of receipt of the RLN message from the slave process of program block 6, assembles it to form a standard acknowledgement and sends this to the CM layer of the slave process. After this, the RL layer of the slave process remains waiting for a release from the CM layer of the slave process unless there are more RLN messages related to the same response function from the same terminal. The CM layer of the slave process sends an acknowledgement to the terminal and remains waiting for an acknowledgement from the terminal. Upon receiving the acknowledgement, the CM layer of the slave process releases the resources engaged in the short-message service.

The access node processes the TL layer data of the short message, thus diverging from the system solution, and knows whether there are more short messages coming from the terminal device. In other words, the RL layer slave process of the access node knows about the coming short message. The RL layer slave process remains waiting for the next RLN messages if more than one are expected.

If the terminal device has a new short message to be sent, it sends a short message service request before the last acknowledgement. Thus, the call control system can use the same Abis interface connection again. In any case, the terminal device sends the last acknowledgement about the preceding short message. The call control system transmits this to the CM layer of the slave process. Upon receiving the acknowledgement, the CM layer sends a request to release the resources as normal, but the call control system releases the resources used for the preceding message and preserves the Abis interface connection. The terminal device sends a new short message via the same Abis interface connection. The call control system transmits the message to the master process of program block 8, which, based on the number of the operation control function or on the IMSI code, directs the message to the CM layer of the right slave process. The CM layer sends the message further to the RL layer.

The short-message service has the lowest priority among all the services of the access node. In other words, the short-message service is not allowed to impair other services currently active in any way, so it works on conditions fully dependent on the other services.

The call control system call control system sets up separate slave chains for a call and for short-message service. Therefore, both activities occur as separate services in the access node up to the Abis interface. However, the Abis interface must be informed as to whether there is a call going on at the terminal device in question or not. If there is no call going on, then the short message is sent using the SDCCH signalling channel. If a call is simultaneously active, then the short message is sent using the SACCH signalling channel associated with the communication channel being used. When a call is simultaneously active, the transmission of a short message works considerably more slowly, so the short-message service block must be informed regarding the channel to be used for the transmission. This is because the short message management program block uses timers in conjunction with the transmission of each short message, and the timer values must be higher when the SACCH signalling channel is used. Therefore, in conjunction with the subscriber search, the call management system always informs the short-message service about the channel to be used.

When the terminal device sets up a call in the middle of the transmission of a short message, the message transmission is transferred from the SDCCH signalling channel to the SACCH signalling channel. This is because the call setup signalling is carried by that same SDCCH channel.

When a call is terminated in the middle of the transmission of a short message, it is possible either to go on using the SACCH signalling channel or to change over to the SDCCH signalling channel.

In error situations, the terminal device acknowledges failure of transmission of the operation control function by sending an RLN message. The RLN error message is transmitted unencrypted and using the same encoding method that was used in the encoding of the operation control function that caused the error. An error code indicates the error that occurred in the transmission of the operation control function. Possible error codes are e.g. wrong function number, error in the CRC check number (CRC, Cyclic Redundancy Check) at the end of the RLN message, incorrect address, over-loaded RLN management software, memory overflow or too many tasks. Upon receiving an RLN error message, program block 2 sends an acknowledgement of unsuccessful transmission of an operation control function to program block 1 and to the user interface. The acknowledgement contains data indicating the cause of the error. The resources reserved are released immediately after the acknowledgement.

The call control system may send an error message at any time during the transmission of a short message. Typical error messages may be e.g. unsuccessful signalling at the Abis interface, failure of Abis interface connection or connection failure due to some other cause. At the beginning of a short message transmission, the call control system may interrupt the transmission if the same terminal device already has a short message transmission going on in the same direction. Simultaneous transmission is only possible for one incoming short message to the terminal device and one outgoing short message.

The short message management block may interrupt the transmission when an error appears either in the RL layer or the CM layer. The CM layer may detect an error in the reception of the message and acknowledge it by sending a message to the terminal device. If the short message has been incorrectly received or if an error has occurred in the reception of the RLN response message, the RL layer will notice this. In this case, the RL layer sends an acknowledgement message to the CM layer, which transmits it within the CP-DATA to the terminal device. After all these error situations, the user is informed of the transmission failure and all resources engaged are released.

The invention is not restricted to the examples of its embodiments described above, but many variations are possible within the scope of the inventive idea defined by the claims.

What is claimed is:

1. Procedure for the transmission of operation control functions in a telecommunication system comprising a local exchange, a user interface provided in the system, an access node connected to the local exchange via a V5 interface, a wireless local loop system connected to the access, node, and a terminal device connected to the access node via the wireless local loop system, characterised in that, based on input supplied via the user interface, the operation control functions are generated in the access node and transmitted in the form of short messages directly from the access node to the terminal device.

2. Procedure as defined in claim 1, characterised in that the transmission of short messages is combined with a call control slave chain.

3. Procedure as defined in claim 1, characterised in that data in the TL and RL layers of the short message are modified in the access node.

4. Procedure as defined in claim 1, characterised in that the connection between the terminal device and the corresponding slave process is accomplished on the basis of a V5 interface subscriber identity code supplied by the user interface and/or of the international subscriber identity (IMSI) code.

5. Procedure as defined in any claim 1, characterised in that the operation control functions are converted in the access node into a form compatible with the terminal device.

6. Procedure as defined in claim 1, characterised in that the transmission of a timed operation control function from the access node to the terminal device is started upon the lapse of a preset length of time.

7. Procedure as defined in claim 1, characterised in that the terminal device is expected to return an acknowledgement of the operation control function sent to it.

8. Procedure as defined in claim 1, characterised in that the identification number of the access node is added to the short message.

9. Procedure as defined in claim 1, characterised in that unused fields of the short message are filled with characters to form a short message of normal form.

10. Procedure as defined in claim 1, characterised in that an operation control function consisting of a plurality of short messages is transmitted as a succession of short messages.

11. Procedure as defined in claim 1, characterised in that the resources reserved for the transmission of a short message are released after an acknowledgement of termination of the short message has been received from the terminal device.

12. Procedure as defined in claim 1, characterised in that the operation control function is transmitted in an encrypted form.

13. Procedure as defined in claim 1, characterised in that the subscriber is identified, encrypted messages are processed and a slave chain is formed in conjunction with the reception of a short message in the same way as in the case of a normal call.

14. Procedure as defined in claim 1, characterised in that the short message sent by the terminal device is decrypted in the access node and a response message to the operation control function is separated from it.

15. Procedure as defined in claim 1, characterised in that the operation control function is assembled in the access node from a plurality of short messages sent by the terminal device.

16. Procedure as defined in claim 1, characterised in that the channel to be used for short message service is received from call management in conjunction with subscriber search.

17. Procedure as defined in claim 1, characterised in that, when the terminal device has a call going on at the same time, the short message is transmitted using the SACCH signalling channel, and when the terminal device has no call going on, the short message is transmitted using the either the SACCH or the SDCCH signalling channel.

18. Procedure as defined in claim 1, characterised in that, in consequence of an error situation, an error message is sent from the terminal device to the access node, indicating the error that has occurred in the transmission of the operation control function.

19. Procedure as defined in claim 1, characterised in that the resources engaged are released when an error is detected in the transmission of the operation control function.

20. Procedure as defined in claim 1, characterised in that the wireless local loop system is based on the GSM system.

* * * * *